W. T. COLE.
TABBING DEVICE.
APPLICATION FILED DEC. 2, 1919.
1,359,032.
Patented Nov. 16, 1920.
4 SHEETS—SHEET 2.
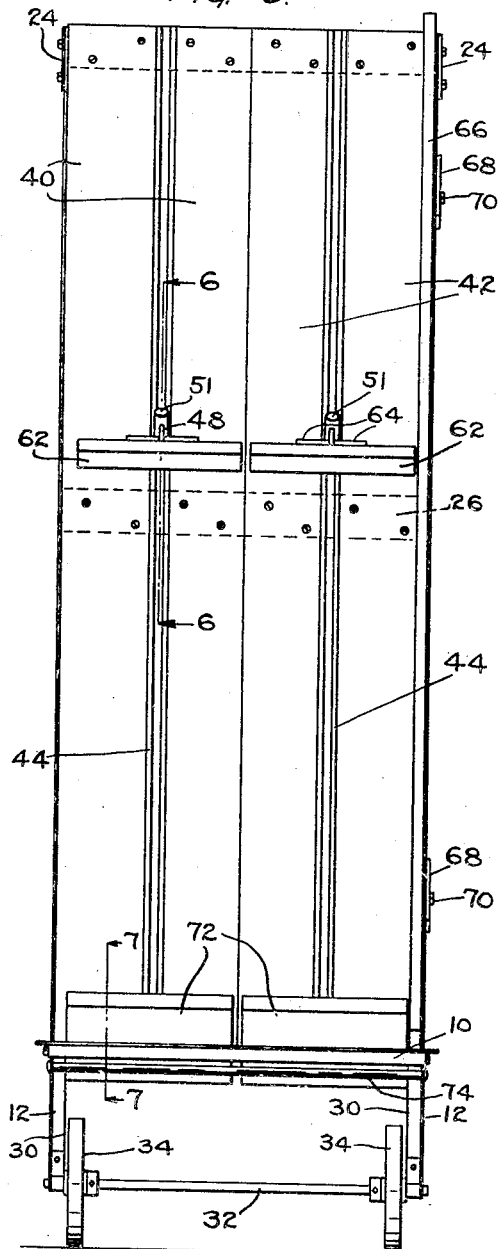
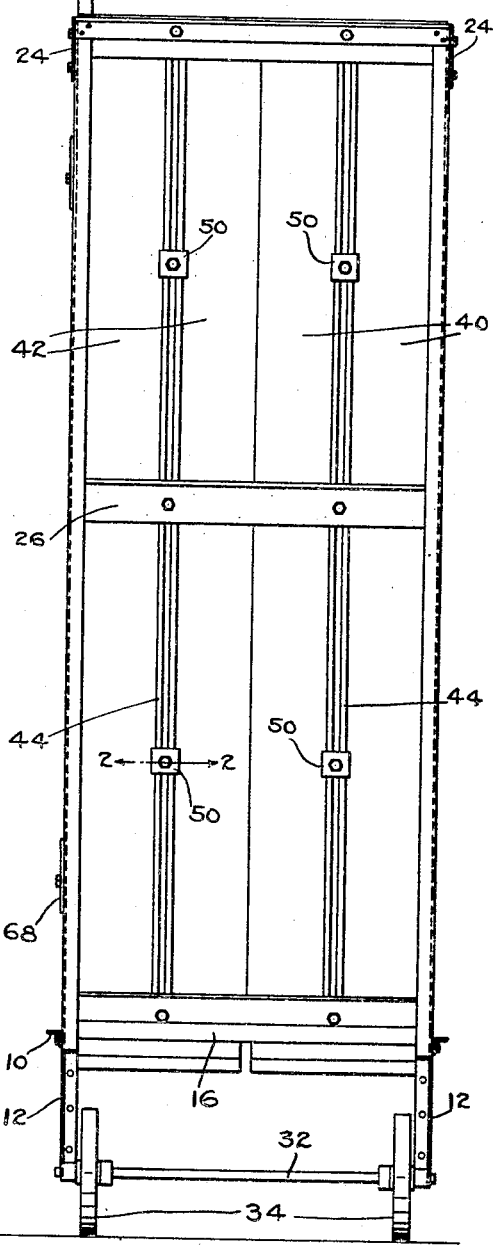
INVENTOR:
WILSON T. COLE.
BY Whiteley and Ruckman
ATTORNEYS W. T. COLE.
TABBING DEVICE.
APPLICATION FILED DEC. 2, 1919.
1,359,032.
Patented Nov. 16, 1920.
4 SHEETS—SHEET 3.
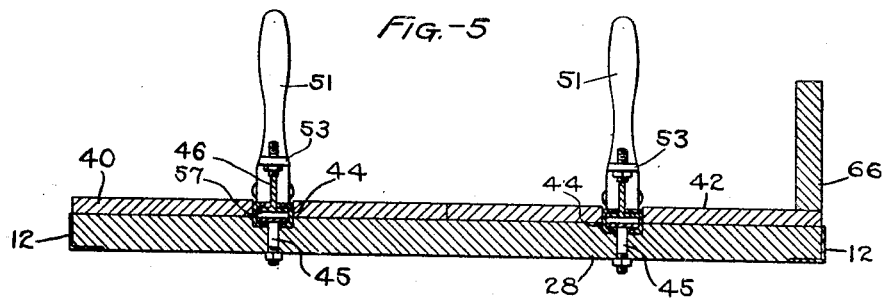
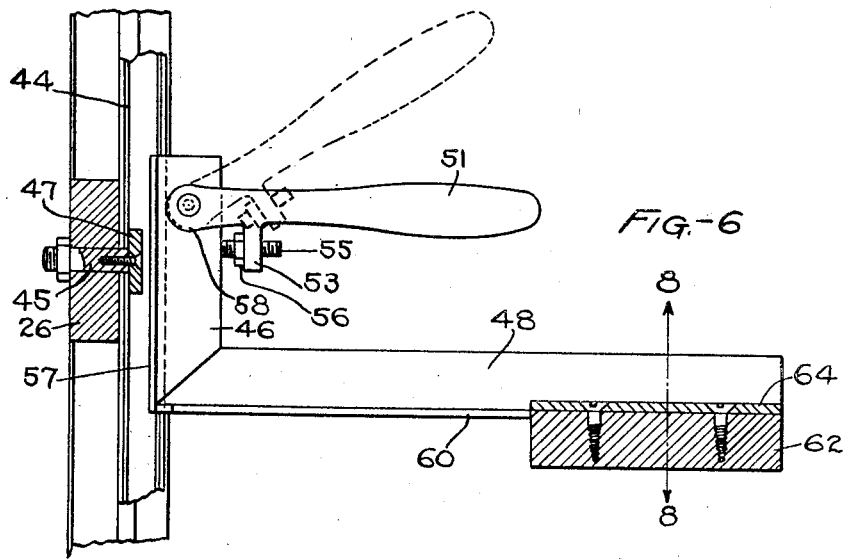
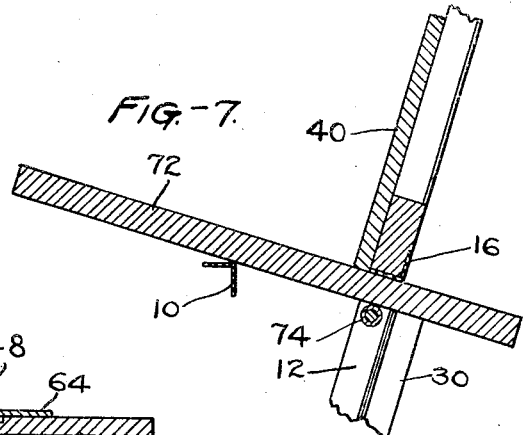
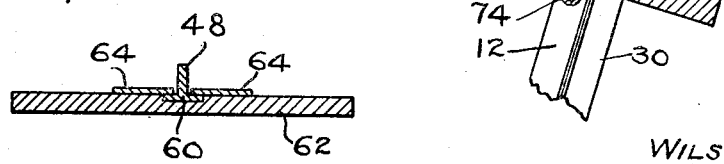
INVENTOR:
WILSON T. COLE.
BY Whiteley and Ruckman
ATTORNEYS.

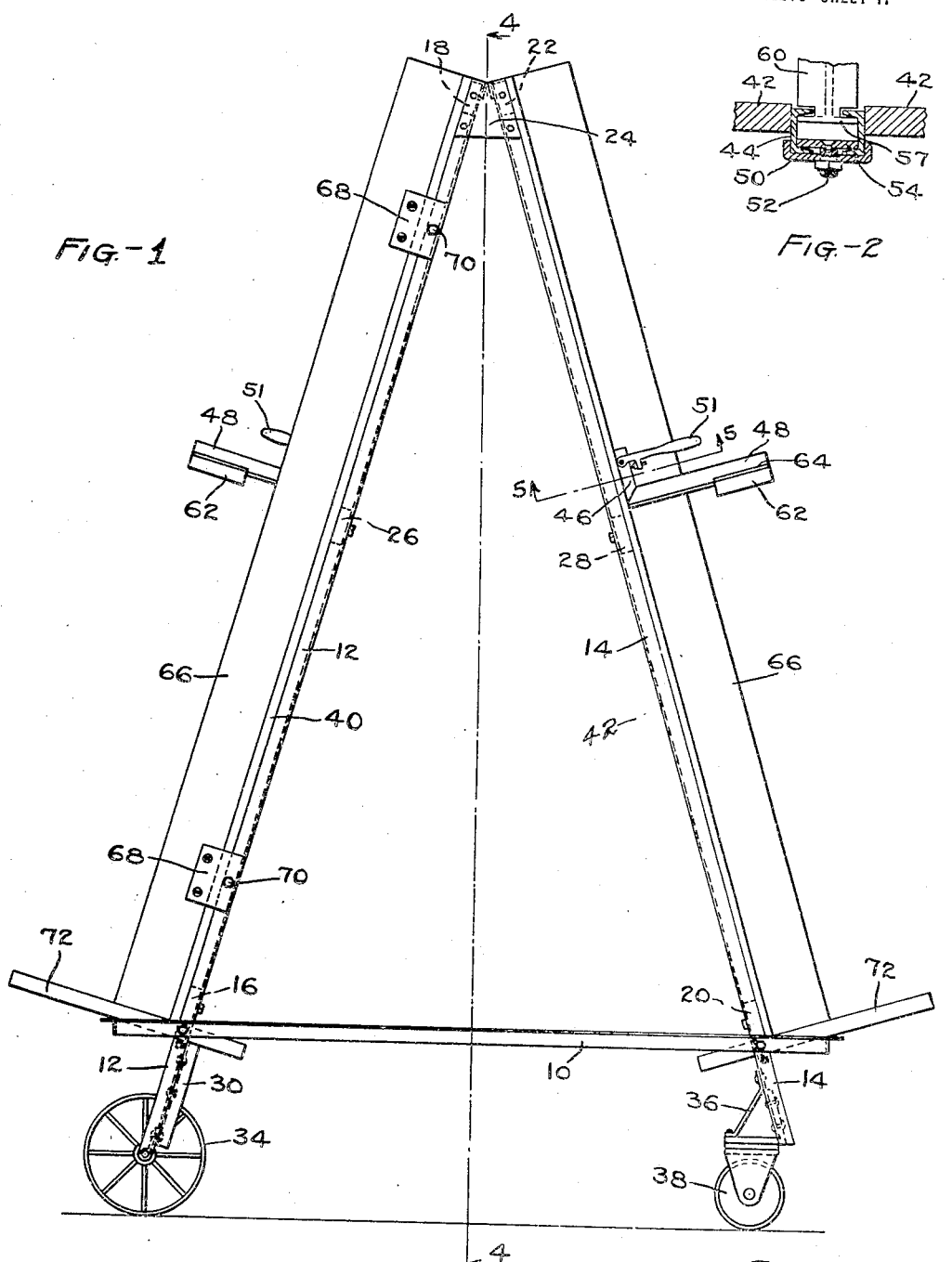

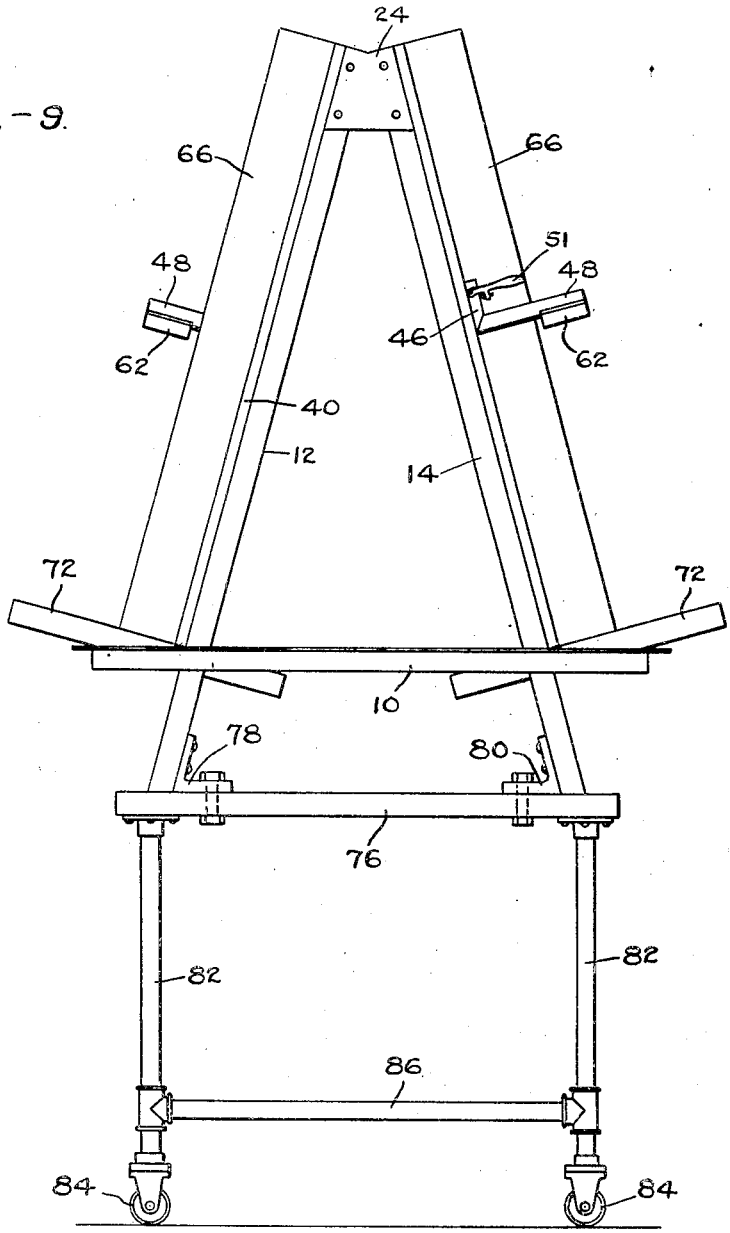

UNITED STATES PATENT OFFICE.

WILSON T. COLE, OF MINNEAPOLIS, MINNESOTA.

TABBING DEVICE.

1,359,032. Specification of Letters Patent. Patented Nov. 16, 1920.

Application filed December 2, 1919. Serial No. 342,025.

*To all whom it may concern:*

Be it known that I, WILSON T. COLE, a citizen of the United States, residing at Minneapolis, in the county of Hennepin and State of Minnesota, have invented certain new and useful Improvements in Tabbing Devices, of which the following is a specification.

My invention relates to tabbing devices and an object is to provide a device of this character which will facilitate tabbing on a large scale. An object in particular is to provide a device upon which the material to form tabs is placed and securely held while being glued or secured together at one end or side, and which may be used as a car to carry the tabs or material therefor from one place to another, as for instance, from the cutting machine to the place where glue, or tab cement, may be applied, or to packing or shipping room, without danger of spilling the tabs or material therefor.

The full objects and advantages of my invention will appear in connection with the detailed description thereof and the novel features embodied in my inventive idea will be particularly pointed out in the claims.

In the accompanying drawing:—

Figure 1 is a view in side elevation. Fig. 2 is a view in section on the line 2—2 of Fig. 4. Fig. 3 is a view in end elevation. Fig. 4 is a view in section on the line 4—4 of Fig. 1. Fig. 5 is a view in section on the line 5—5 of Fig. 1. Fig. 6 is a view in section on the line 6—6 of Fig. 3. Fig. 7 is a view in section on the line 7—7 of Fig. 3. Fig. 8 is a view in section on the line 8—8 of Fig. 6. Fig. 9 is a view in side elevation of a modified form of construction.

Referring to the form of device, more particularly as shown in Figs. 1 to 8, the character 10 designates an angle iron base having four sides and an open center. Secured to the sides of the base, near its rear end, are a pair of angle bars 12 which extend a short distance below the base and which above the base incline inwardly so that their upper ends meet the upper ends of a similar pair of angle bars 14, secured to the sides of the base near its front end. A cross bar 16 connects the pair of angle bars 12 near the base and a cross bar 18 connects them at the top. A cross bar 20 connects the pair of angle bars 14 near the base and a cross bar 22 connects them at the top. Plates 24 secure together the pairs of angle bars at the top. The pair of angle bars 12 are joined by a cross bar 26 intermediate their ends and the pair of angle bars 14 are joined by a cross bar 28 intermediate their ends. The angle bars 12 below the base are reinforced by pieces 30 and an axle 32 is mounted at the lower ends of the angle bars. This axle carries two wheels 34. Brackets 36 are secured to the lower ends of the angle bars 14 and caster wheels 38 are swiveled to these brackets. A car is thus provided which can be turned in its own floor space. The cross bars 16, 18 and 26, serve to support an inclined surface which, as shown, consists of boards 40 and 42 while the cross bars 20, 22 and 28 also serve to support a similar inclined surface consisting of boards similar to the boards 40 and 42. Between the boards 40 and also between the boards 42 at both front and rear are mounted guide ways 44 which as best shown in Figs. 2 and 5 consist of a pair of angle strips. These guide strips are secured to the cross bars by bolts 45 which have heads 47 engaging the flanges of the strips as best shown in Fig. 6. The guide strips are also held together by clips 50 and bolts 52 having heads 54 as best shown in Fig. 2. The guides 44 carry tighteners or followers each of which has the following construction best shown in Figs. 5 and 6. Angle members have two arms 46 and 48 at right angles to each other. A handle 51 is pivoted to the arm 46 and this handle carries a depending lug 53 which is provided with a hole for receiving a set screw 55 having a lock nut 56. The arm 46 has a flange 57 which slides in the guide 44 and the handle 51 is provided with a cam portion 58 which clamps the follower in place when the handle is in full line position as shown in Fig. 6. When the handle is moved up toward the dotted line position shown in this figure, the follower is released and may be moved up or down upon the guide way. The adjustable screw 55 serves as a stop for the handle and as the cam portion 58 wears, this screw may be set so that the cam will engage sufficiently to hold the follower in place but without excessive clamping action of the cam. Wear upon the parts is thus reduced to the minimum. The arm 48 has a flange 60 upon which the engaging member 62 of the follower is adapted to be slid back and forth according to the size of the material which is to be held. The member 62 has plate 64, secured thereto which engage the upper side of the flange 60 as shown in Fig. 8. A square-up gage 66 is provided for at least one side of each inclined surface. This gage has plates 68 secured thereto and bolts 70 extending through these plates serve to hold the gage in place. Upon removing the bolts, the gage may be applied to the center or other side of the inclined surface.

Rests 72 are provided for both front and rear of the device and these rests are supported by the angle iron base 10 and rollers 74 as best shown in Fig. 7. The rollers 74 are mounted below the cross bars 16 and 20 which engage the top of the rests 72 so that the latter will be held in place but may be slid back and forth according to the size of the material.

The modification shown in Fig. 9 is similar to that already described in most of the essential details and the same reference characters are therefore used so far as applicable. This form of the device is intended more particularly for smaller quantities of material and is shown mounted upon a table 76. In order to mount the device, the lower ends of the pairs of inclined bars 12 and 14 are provided with brackets 78 and 80 respectively which may be bolted to the table top. Upon removing the bolts, the device may be taken from the table and placed upon any suitable support. The table is provided with legs 82 which carry caster wheels 84 at their lower ends so that the device may be used as a truck. The legs are braced by rods 86.

The operation and advantages of my invention will be readily understood in connection with the foregoing description. The upwardly inclined boards 40 and 42 constitute a tab support which supports or retains in an inclined position the tabs or material therefor, which are placed on the rests 72 as they are taken from the cutting machine. When the desired quantity of material has been piled upon the device, such material is securely held in place by bringing down the follower and clamping it in position. On account of the adjustability of the rests and followers, the device may be readily employed for tabs of different sizes. The device will readily carry four rows of ordinary tabs or a greater number of rows of smaller tabs. On account of the inclined position in which the tabs are supported, danger of spilling is avoided and the device may, therefore, be readily wheeled from one place to another. This device may be used as a truck to take labels or other small jobs directly from cutting machine. The form of the device shown in Fig. 9 may be used either as a truck or the tab-holding portion may be removed and placed upon any suitable support.

I claim:

1. A tabbing device comprising a base member, an upwardly inclined tab support secured to said base member, a rest mounted at the lower portion of said support, a follower carried by said support, and means for securing said follower in desired position.

2. A tabbing device comprising a base member, an upwardly inclined tab support secured to said base member, a rest mounted at the lower portion of said support, a follower carried by said support, means for securing said follower in desired position, and a square-up gage mounted on said inclined support.

3. A tabbing device comprising a base member, an upwardly inclined tab support secured to said base member, a rest mounted at the lower portion of said support, a guide-way associated with said inclined support, a follower carried by said guide-way, a clamp for securing said follower in desired position and an adjustable stop for limiting the clamping action of said clamp.

4. A tabbing device comprising a base member, an upwardly inclined tab support secured to said base member, a rest mounted at the lower portion of said support, a guideway associated with said support, an angle member carried by said guide-way, a follower slidably mounted on said angle member, and a clamp for securing said angle member in desired position along said guideway.

5. A tabbing device comprising a base member, an upwardly inclined tab support secured to said base member, a rest mounted at the lower portion of said support at right angles thereto, said rest being slidable in a plane substantially at right angles to said support, a follower carried by said support, and means for securing said follower in desired position.

6. A tabbing device comprising a base member, upwardly inclined tab supports secured adjacent the end portions of said base member, said supports converging in an upward direction, rests mounted on the lower portion of said supports, followers carried by said supports and clamps for securing said followers in desired position.

7. A tabbing device comprising a wheeled base member, upwardly inclined tab supports secured adjacent the end portions of said base member, the upper ends of said supports being adjacent each other and secured together, rests mounted on the lower portion of said supports, followers carried by said supports and clamps for securing said followers in desired position.

In testimony whereof I hereunto affix my signature.

WILSON T. COLE.